United States Patent [19]

Lohr et al.

[11] Patent Number: 5,417,620

[45] Date of Patent: May 23, 1995

[54] LOADING DEVICE FOR CONTINUOUSLY VARIABLE TRANSMISSION

[75] Inventors: Charles B. Lohr, Kettering; William J. Heidemann, Sidney, both of Ohio

[73] Assignee: The Torax Company, Inc., Dayton, Ohio

[21] Appl. No.: 202,500

[22] Filed: Feb. 28, 1994

Related U.S. Application Data

[62] Division of Ser. No. 991,321, Dec. 16, 1992.

[51] Int. Cl.⁶ ............................................. F16H 15/08
[52] U.S. Cl. ............................................ 476/40; 476/41; 476/46
[58] Field of Search .................. 476/10, 40, 41, 42, 476/45, 46

[56] References Cited

U.S. PATENT DOCUMENTS

| | | | |
|---|---|---|---|
| 3,087,348 | 4/1963 | Kraus | 476/10 |
| 3,163,051 | 12/1964 | Kraus | 476/10 |
| 3,570,317 | 3/1971 | Kraus | 476/10 |
| 3,810,398 | 5/1974 | Kraus | 476/46 |
| 4,126,052 | 11/1978 | Jackman | 476/10 |
| 4,275,610 | 6/1981 | Kraus | 476/10 |
| 4,398,778 | 8/1983 | Kraus | 384/615 |
| 4,434,675 | 3/1984 | Kraus | 476/10 X |
| 4,702,118 | 10/1987 | Kraus | 476/10 |
| 4,858,484 | 8/1989 | Kraus | 476/46 X |
| 4,885,955 | 12/1989 | Kraus | 475/185 |
| 4,911,030 | 3/1990 | Kraus | 476/10 |
| 4,964,312 | 10/1990 | Kraus | 476/10 |
| 4,974,466 | 12/1990 | Kraus et al. | 476/40 |
| 5,020,384 | 6/1991 | Kraus | 476/10 X |
| 5,085,089 | 2/1992 | Kraus | 476/41 |

FOREIGN PATENT DOCUMENTS

| | | | |
|---|---|---|---|
| 56-160453 | 12/1981 | Japan | 476/46 |
| 1-275951 | 11/1989 | Japan | 476/46 |

Primary Examiner—Allan D. Herrmann
Assistant Examiner—David W. Laub
Attorney, Agent, or Firm—Killworth, Gottman, Hagan & Schaeff

[57] ABSTRACT

A compact structure is provided for an continuously variable transmission, which provides a more direct application of both load and control forces at the pivot trunnion. Load forces are produced from within the pivot trunnion, providing more direct control over load forces and their effect on contact forces between traction rollers and toric discs. Control forces which establish the desired transmission ratio are applied to the pivot trunnion in a manner which substantially eliminates twisting and squirming of the support rollers. High efficiency in operation, and improved assembly is provided with the compact structure disclosed.

11 Claims, 9 Drawing Sheets

LOADING DEVICE FOR CONTINUOUSLY VARIABLE TRANSMISSION

This is a division of application Ser. No. 07/991,321, filed Dec. 16, 1992.

BACKGROUND OF THE INVENTION

The present invention relates to continuously variable transmissions in which power is transmitted through pivotally supported traction rollers whose transmission ratio determining pivot position may be varied by hydraulic mechanisms.

In continuously variable transmissions, two toric traction discs are rotatably supported in a housing along an axis opposite one another to define therebetween a toric cavity in which a motion transmitting traction roller is disposed. The traction roller is frictionally engaged with the toric discs in circles of varying diameters depending on the transmission ratio, and is so supported that it can be moved axially to initiate a change in the transmission ratio. Continuously variable transmissions may be used, for example, in some infinitely variable transmissions.

Various mechanical and hydraulic arrangements are known for continuously variable transmissions. In one such arrangement the traction roller is supported by a pivot trunnion which has an opposing support roller received in a partial circular track. Controlled motion of the support roller in the track and movement of the traction roller axially can be induced by slightly tilting the pivot trunnion in a plane normal to the axis of the toric discs during transmission operation.

Mechanical and hydraulic mechanisms which induce this axial motion and produce change in transmission ratios by such tilting are shown, respectively, in U.S. Pat. No. 4,964,312 issued Oct. 23, 1990 to Kraus, and U.S. Pat. No. 4,911,030 issued Mar. 27, 1990 to Kraus. These mechanisms produce a control force which operates upon a projecting control end of the pivot trunnion to provide slight tilting of the trunnion. Thus, as pivot trunnions are tilted by such mechanisms, their support rollers twist and squirm in the partial circular track, and experience significant edge loading and edge wear. Additional friction force results which resists change in the transmission ratio, reduces the transmission efficiency, and prematurely wears the traction surfaces. Load pressure variations and slippage of contact surfaces can result.

Adding to these problems, the contact forces required to engage the various traction surfaces of the traction roller and the toric discs are typically very high. Such contact forces have been supplied by simple mechanical means, such as a preload adjustment screw, shown in the '312 patent, which applies a loading force to the partial circular track generally normal to the axis, while more significant load forces have been applied by axial cam mechanisms known in the art. Larger, variable loading forces have been supplied by hydraulic means, such as hydraulically driven wedges positioned to apply force to the partial circular track, as shown in the '312 and '030 patents. The hydraulic wedges produce higher contact forces needed to handle the larger torques present in high power transmissions. As shown in the '030 patent, the hydraulic load force acts at the same time as the separately applied control force acts to tilt the pivot trunnion and change the transmission ratio. However, while the hydraulic systems produce higher contact forces, the added forces exacerbate many of the problems caused by tilting, such as twisting and squirming of the support rollers, and increased wear, discussed above.

Accordingly, the need remains for improvements in continuously variable transmissions to facilitate transmission ratio change and provide loading sources, while avoiding the above problems.

SUMMARY OF THE INVENTION

The present invention satisfies the need for applying load and control forces in a continuously variable transmission with a more compact structure which provides a more direct application of both forces at the pivot trunnion. In accordance with the present invention, load forces are produced from within the pivot trunnion, providing more direct control over load forces and their effect on contact forces between traction rollers and toric discs. Control forces which establish the desired transmission ratio are applied to the pivot trunnion in a manner which substantially eliminates twisting and squirming of the support rollers.

The continuously variable transmission of the present invention includes a support structure, two toric traction discs rotatably supported by the support structure for rotation about a central axis, one for rotation with an input shaft and the other for rotation with an output shaft. The toric discs have opposing traction surfaces defining therebetween a toric cavity, and at least two motion transmitting traction rollers are disposed in the toric cavity in spaced relationship, in engagement with the toric discs for transmission of motion therebetween, and each of the traction rollers is rotatably supported by a pivot trunnion supported to pivot about a pivot axis. The continuously variable transmission includes means for controllably pivoting the pivot trunnions to produce a transmission ratio change, and means for forcing the traction rollers into force transmitting engagement with the toric discs. At least a portion of the means for forcing is disposed in each of the pivot trunnions to produce an outward load force from within each pivot trunnion and vary the load force as needed to maintain the force transmitting engagement.

The means for controllably pivoting and means for forcing comprise second and first hydraulic control means, respectively, which are preferably both included in a single hydraulic cylinder connected to each pivot trunnion. This preferred arrangement permits a more direct relationship to be established between control and load forces applied by the cylinder, eliminates hydraulic drag between separated control and load cylinders, and also permits improved damping of load pressure variations. As well, this structure of the present invention is also more compact and has higher efficiencies than known designs, such as shown in the '312 and '030 patents. For example, increased transmission ratio range is obtained with the present invention due to the direct application of load forces from within the pivot trunnion to the contact surfaces.

Accordingly, it is an object of the present invention to provide a structure which provides a direct application of load forces at the pivot trunnion of a continuously variable transmission. It is a further object of the present invention to provide more direct control over load forces applied to the continuously variable transmission to avoid undesirable pressure variations.

It is a further object of the present invention to provide a structure which provides more direct application of control forces to the pivot trunnion of a continuously variable transmission. It is a further object of the present invention to apply control forces in a continuously variable transmission in a way which eliminates problems with twisting and squirming of pivot trunnion support rollers.

It is a further object of the present invention to provide a more compact structure which provides both load and control forces to an continuously variable transmission. It is a further object of the present invention to produce an continuously variable transmission which operates with higher efficiency.

Finally, it is a further object of the present invention to provide an continuously variable transmission which may be more easily assembled.

These and other objects, features and details of the present invention will be apparent from the description, drawings and claims which follow.

DETAILED DESCRIPTION OF THE PREFERRED EMBODIMENTS

Figure 1:
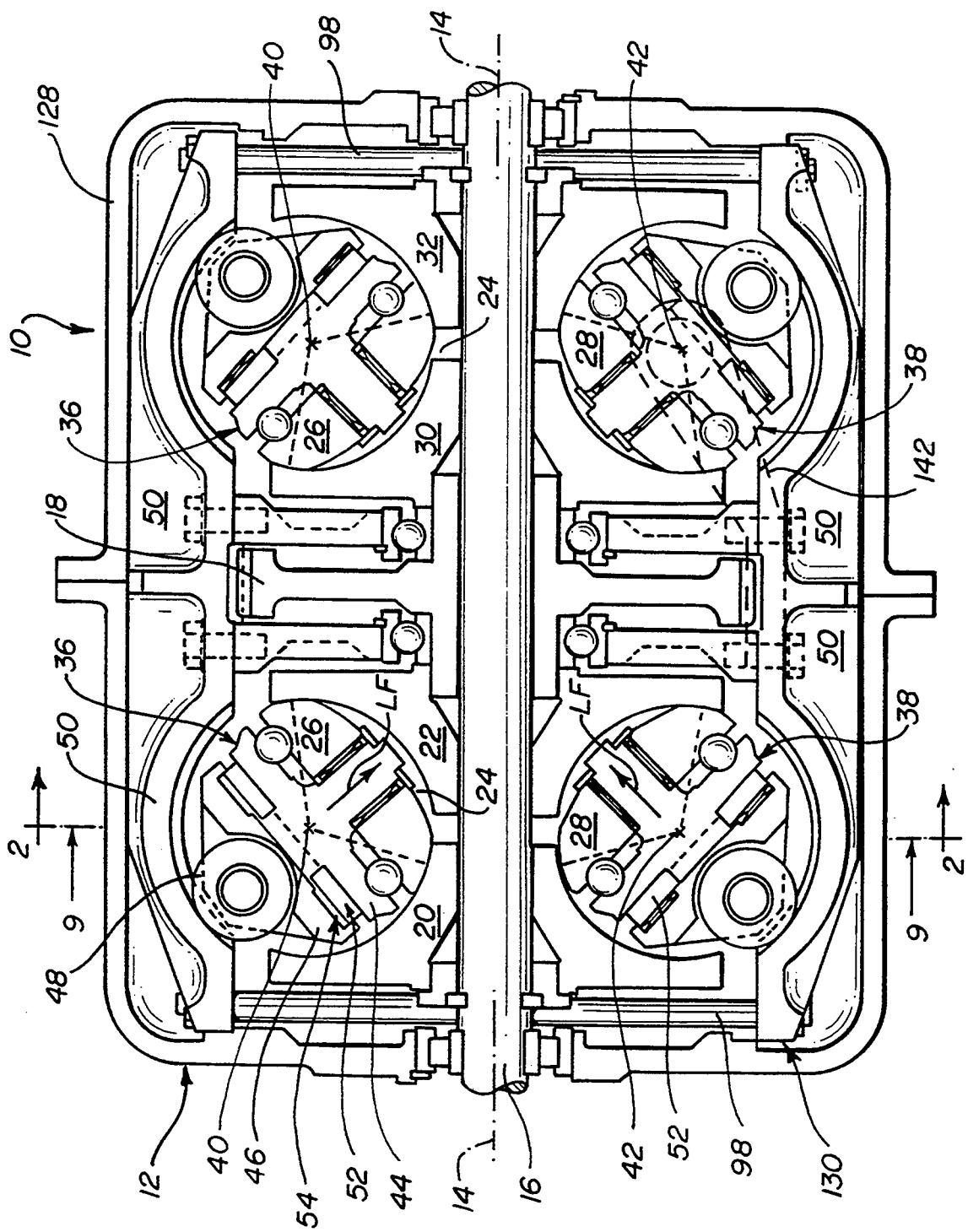
FIG. 1 is an axial cross-sectional view of the continuously variable transmission of the present invention.

Referring to FIG. 1, the continuously variable transmission 10 of the present invention includes a support structure 12, and toric traction discs 20, 22, 30, 32 rotatably supported by the support structure 12 for rotation about a central axis 14. At least two toric traction discs are required, and four toric traction discs 20, 22 and 30, 32 are shown. One toric traction disc 20, 30 of each pair is for rotation with an input shaft 16 and the others 22, 32 are for rotation with an output shaft 18. The toric discs 20, 22 and 30, 32 have opposing traction surfaces defining therebetween a toric cavity 24. In each toric cavity 24, it is preferred to have two motion transmitting traction rollers 26, 28 in spaced relationship engaging the toric discs for transmission of motion therebetween. While three or four traction rollers may be disposed in spaced relationship in each toric cavity 24 and will provide increased life for the contact surfaces as the total surface area is increased, two contact rollers 26, 28 are preferred for simplicity. Each of the traction rollers 26, 28 is rotatably supported by a pivot trunnion 36, 38, respectively. The pivot trunnions 36, 38, in turn, are supported to pivot about their respective pivot axis 40, 42. Discussed in greater detail below, the continuously variable transmission 10 includes means for controllably pivoting the pivot trunnions 36, 38 to produce a transmission ratio change, and means for forcing the traction rollers 26, 28 into force transmitting engagement with the toric discs. In accordance with the present invention, at least a portion of the means for forcing is disposed in each of the pivot trunnions 36, 38 to produce an outward load force LF from within each pivot trunnion 36, 38 and vary the load force as needed to maintain the force transmitting engagement.

Figures 2, 3:
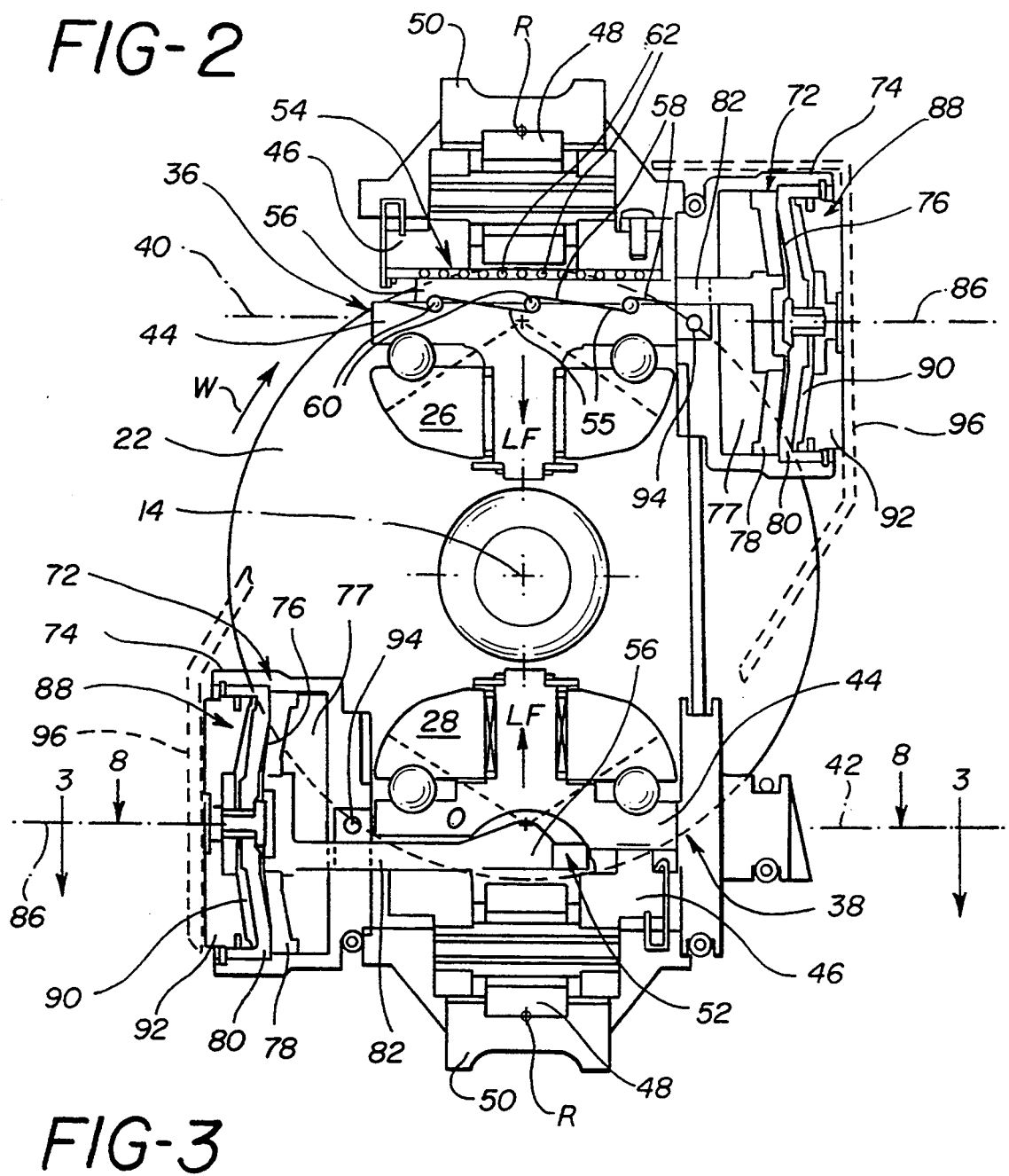
FIG. 2 is a cross-sectional view of FIG. 1 taken along line 2—2 showing the preferred embodiment with the housing removed for clarity.
FIG. 3 is a cross-sectional view of FIG. 2 taken along line 3—3 of FIG. 2.

It may be understood from FIGS. 1 and 2 that the surfaces of the toric discs 20, 22, 30, 32 defining the toric cavities 24 have a radius of curvature the origin of which coincides with the pivot axis 40, 42. This geometry permits the pivot trunnions and traction rollers to pivot and maintain contact with the surfaces of the toric discs 30, 32. It may also be understood that the toric cavity 24 defined by the toric discs 20, 22 is not an ideal toric cavity, but actually has a substantially semi-circular cross-section. Thus, the continuously variable transmission 10 of the present invention may also be referred to as a half-toroidal drive.

As may be seen in FIGS. 1 and 2, the pivot trunnions 36, 38 each include a first portion 44 supporting the traction roller 26 and a second portion 46 including a pivot structure. Positioned between the first and second portions 44, 46 is the portion of the means for forcing disposed in the pivot trunnions 36, 38. The pivot structure includes a support roller 48 mounted on the second portion 46, while the support structure 12 includes a partial circular track structure 50 which receives and supports each support roller 48 to pivot the pivot trunnions 36, 38 about their respective pivot axis 40, 42.

In accordance with the present invention, the portion of the means for forcing disposed in each pivot trunnion 36, 38 includes a wedging means 52, and means 54 for sliding the wedging means 52 in the pivot trunnions 36, 38 to produce an outward load force LF from within the pivot trunnions 36, 38. Because the load force LF is produced from within, rather than imposed from outside the pivot trunnions 36, 38, the force is more evenly distributed along the surface of the traction rollers 26, 28, which is particularly advantageous when the pivot trunnions 36, 38 are in extreme positions, such as the one illustrated in FIG. 1.

The direct application of force from within the trunnions of the present invention closely links the control and loading pressures, reducing the required safety factor in the traction coefficient over the '312 and '030 patents. By contrast, the indirect loading imposed by hydraulic devices in the '312 and '030 patents requires compensation in the traction coefficient to balance the hydraulic line loss during transient conditions. Further, the direct application of force in the present invention eliminates frictional losses otherwise present in the control mechanisms of the '312 and '030 patents which occur in the extreme positions shown in FIG. 1. Eliminating the frictional losses reduces control hysteresis at such extreme positions, permitting expanded transmission ratio capability.

In sum, the more even and direct application of force to the traction surfaces in accordance with the present invention makes possible reduced loads and smaller parts. The more direct loading (and resulting elimination of increased hydraulic requirements and frictional losses) lowers the load densities, permitting increased transmission ratio range. As well, removing the structure of the hydraulic devices of the '312 and '030 patents permits a more compact design in the present invention. Not only technically, but from a practical standpoint, compared with the mechanisms of the '312 and '030 patents, the design of the present invention is less expensive to manufacture, easier and less complex to assemble, and operates more efficiently, particularly at extreme transmission ratios.

As illustratively shown in FIG. 2 for pivot trunnion 36, the preferred wedging means 52 includes a surface in the first portion 44 of the pivot trunnion 36 having a plurality of first cam surfaces 55 therein, a rod 56 which has a plurality of second cam surfaces 58 in opposing relationship thereto, and a plurality of roller bearings 60 disposed between the opposing first and second cam surfaces 55, 58. Bearings 62 are also provided between the flat surfaces of the rod 56 and the second portion of pivot trunnion 36, so that the rod 56 is slidably disposed therebetween. Slidable movement of the rod 56 causes the roller bearings 60 to move along the first and second cam surfaces 55, 58 forcing them to vary in separation, and applying load force LF to the traction roller 26. Rotation of toric disc 22 for this arrangement is indicated by arrow ω.

As further shown in FIG. 3, the rod 56 is shaped like an "H", with the posts of the H having the second cam surfaces 58 therein. The open areas between the posts of the H include a plurality of interlocking elements, such as tongue and groove joints 64, which extend between the first and second portions 44, 46 of the pivot trunnion 36 to maintain their relative relationship against sliding when force is applied to the rod 56.

Figure 5:
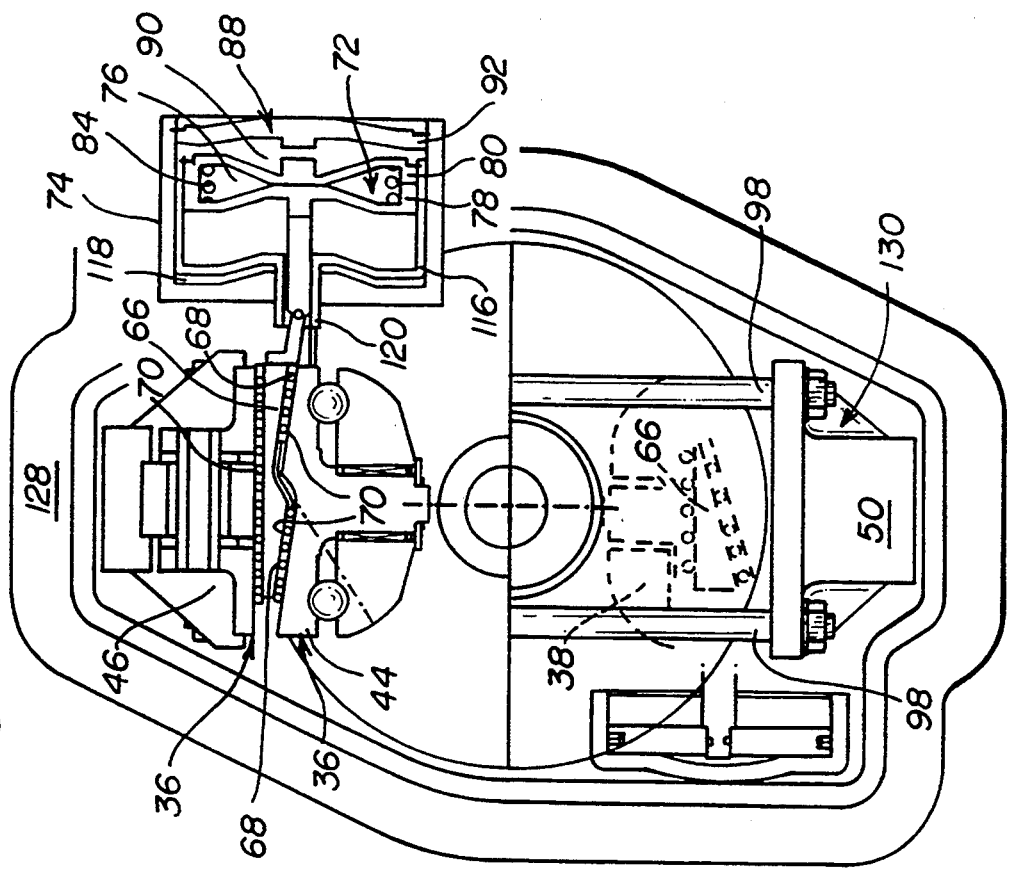
FIG. 5 is a cross-sectional view of FIG. 4 taken along line 5—5 showing an alternative embodiment, housing and support structure.
Figure 4:
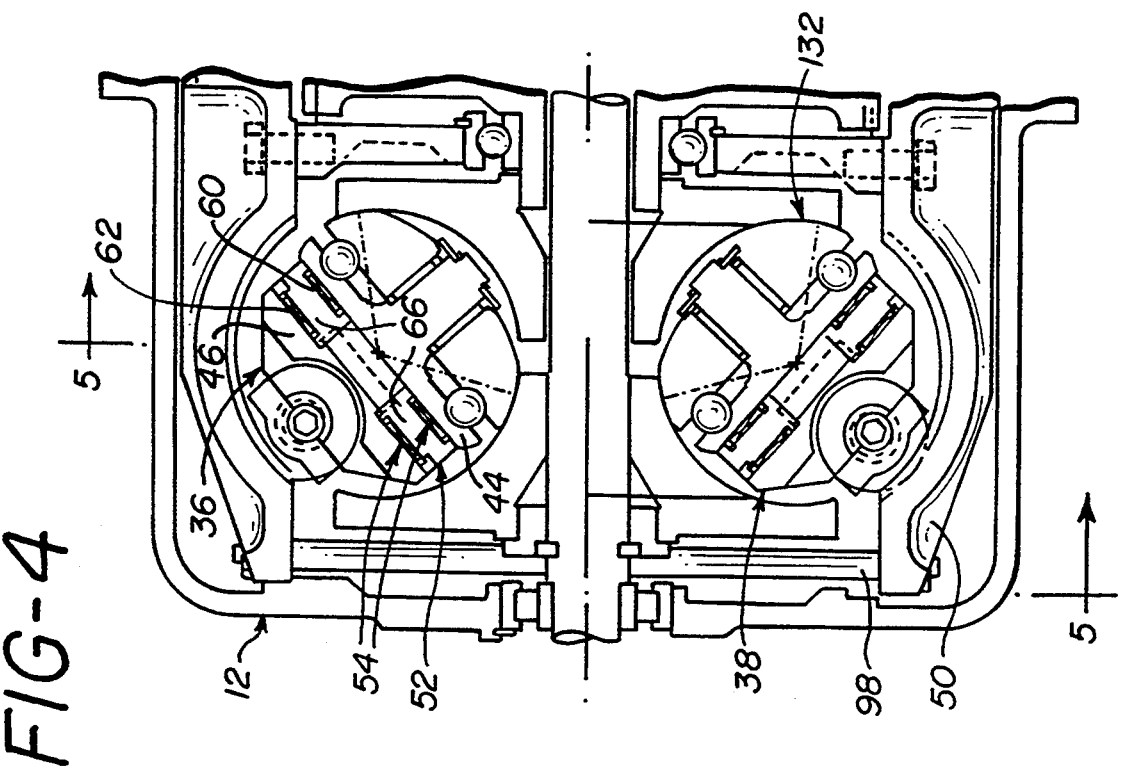
FIG. 4 is a partial axial cross-sectional view of the continuously variable transmission of the present invention.

An alternative embodiment of the wedging means 52 is illustratively shown in FIGS. 4 and 5. FIG. 4 includes the left half of the continuously variable transmission of FIG. 1. The alternative wedging means 52 includes at least one wedge 66 having at least one ramp 68, which is slidably disposed between the first and second portions 44, 46 of the pivot trunnion 36. As shown in FIGS. 4 and 5, two wedges 66 in parallel relationship, each having two ramps 68, are preferred in this alternative. The two ramps 68 provide a more compact assembly than a single ramp wedge (shown in phantom in FIG. 5), and the step between the ramps 68 desirably maintains the wedge 66 within a limited range of operation. Again, the pivot trunnion 36 is illustrative for all pivot trunnions which may be included in the continuously variable transmission 10. The means for sliding the alternative wedging means preferably includes a plurality of bearings 70, such as roller bearings, disposed between the surfaces of the wedges 66 and the opposing surfaces of the first and second portions 44, 46 of the pivot trunnion 36.

Further, in accordance with the present invention, the means for forcing further includes a first hydraulic control means 72 for controllably positioning the portion of the means for forcing disposed in each of the pivot trunnions 36, 38. Shown best in FIG. 2, the first hydraulic control means 72 includes at each pivot trunnion 36, 38, a hydraulic cylinder 74 having a load volume 76 defined therein between a first plate 78 and a second plate 80. Load volume 76 is so named because changes in the load volume 76 cause corresponding changes in the load force LF. Volume 77 is vented to allow movement of first plate 78. The first plate 78 is connected by load rod 82 to the portion of the means for forcing which is disposed in the pivot trunnion 36. In particular, the load rod 82 connects to rod 56. Displacement of the first plate 78 thereby causes the roller bearings 60 to move on the first and second cam surfaces 55, 58, causing the load force LF to vary. The means for forcing thus may expand and contract the pivot trunnions 36, 38 to produce outward load forces, or may simply provide increased pressure against tangential forces applied to the traction rollers 26, 28 by the toric discs 20, 22. Forces produced by the means for forcing can be in the range of 12,000 pounds, depending on the application.

Preloading of the wedging means 52 may be accomplished in several ways. In accordance with the present invention, the first plate 78 in one end position can be deflected such that the first plate 78 itself applies a preload force to the wedging means 52. This one end position is shown at pivot trunnions 36, 38 in FIG. 2, where the first plate 78 is deflected by compression against second plate 80. Such deflection causes first plate 78 to act like a leaf spring, or more precisely, a disc spring, and apply a preload force. It is further understood that as the load volume 76 expands, the preload force reduces and is ultimately released when the first plate 78 is no longer deflected by compression against second plate 80. Alternatively, as shown in FIG. 5, a preload force may be applied with a preload spring 84 compressed in the load volume 76. It is preferred, as shown in FIGS. 9A and 9B, to include a separate leaf spring or disc spring 85 in load volume 76 between the first plate 78 and second plate 80 to apply the preload force. Depending on the application, an additional preload spring 84 may also be added, as further shown in FIGS. 9A and 9B.

Referring again to FIG. 2, in accordance with the present invention, the hydraulic cylinder 74 is disposed so that its centerline 86 is disposed substantially along the pivot axis 40. So positioned, the hydraulic cylinder 74 is able to pivot about the pivot axis 40 with the pivot trunnion 36. Thus, the hydraulic cylinder 74 is able to pivot, yet remain in the same location. As may further be understood by referring to pivot trunnion 38 in FIG. 2, the force applied by the hydraulic cylinder 74 preferably also acts along the pivot axis, there pivot axis 42. In this way the force applied to the pivot trunnion 38 by operation of the means for forcing remains of the same character regardless of the pivoted position of the pivot trunnion. In particular, the preferred structure of FIG. 2 shows the load rod 82 connected to the cross bar portion of the H-shaped rod 56 at point O, which lies along the pivot axis 42. The first portion 46 of the pivot trunnion 38 has a removed area to accommodate this connection. Again, pivot trunnions 36 and 38 are illustrative of the preferred structure which is present in all pivot trunnions in the continuously variable transmission 10.

In accordance with the present invention, the means for controllably pivoting the pivot trunnions 36, 38 for a transmission ratio change comprises a second hydraulic control means 88. As shown in FIG. 2, it is preferred that the first and second hydraulic control means 72 and 88 are included in the same hydraulic cylinder 74 at each pivot trunnion 36, 38. Therein the second hydraulic control means 88 includes a first control volume 90 defined in the hydraulic cylinder 74 between the second plate 80 and a third plate 92. Control volume 90 is so named because changes in the control volume 90 produce the control forces which initiate transmission ratio change. The hydraulic cylinders 74 are connected to the pivot trunnions 36, 38 along their respective pivot axis 40, 42 by known means, such as a bolt 94. The hydraulic cylinder 74 is thereby rotatable about the pivot axis 40, 42 with the pivot trunnion. The third plate 92 is supported by the support structure 12, in particular, rotatably supported by stress plate 96 (shown in phantom). As may be seen in the preferred embodiment of FIG. 2, the outer perimeter of the third plate 92 is slightly curved at the inner wall of the hydraulic cylinder 74, allowing slight tilting of the third plate 92 relative to the cylinder walls. As the second plate 80 is lodged in a step in the cylinder wall, variation of the first control volume 90 causes the entire hydraulic cylinder 74 to move relative to the stress plate 96, and applies a control force to tilt the pivot trunnion 36, 38 about the point of contact R between the support roller 48, which has a slight curvature, and track 50. As the pivot trunnion 36, 38 rotates about point R, slight rotation of the pivot trunnion 36, 38 relative to hydraulic cylinder 74 also occurs along the axis of bolt 94. The connection of the load rod 82 to H-shaped rod 56 at point O also allows this slight rotation. To tilt the pivot trunnion 36, 38 about point R, only a slight lateral movement is required due to the forces present in the rotating toric discs 20, 22. Displacements in the range of approximately 2 millimeters (mm) (0.08 inches) and tilting of approximately 1.3 degrees are typical, but may be greater or less depending on the size of the transmission 10 and application. As a result, the pivot trunnions 36, 38 are caused to pivot about their respective pivot axis 40, 42.

Control forces applied by the means for controllably pivoting typically are in the range of 1400 pounds, but may vary depending on the application. The alignment and connection of the hydraulic cylinder at bolt 94 to the pivot trunnion 36, 38 allows the control volume 90 of the means for controllably pivoting to expand to counter the tangential force applied by the toric discs to the traction rollers, as well as to increase the control load as desired. As a result, net forces experienced at bolt 94 are relatively low as the tangential forces and control forces substantially cancel.

Figure 6:
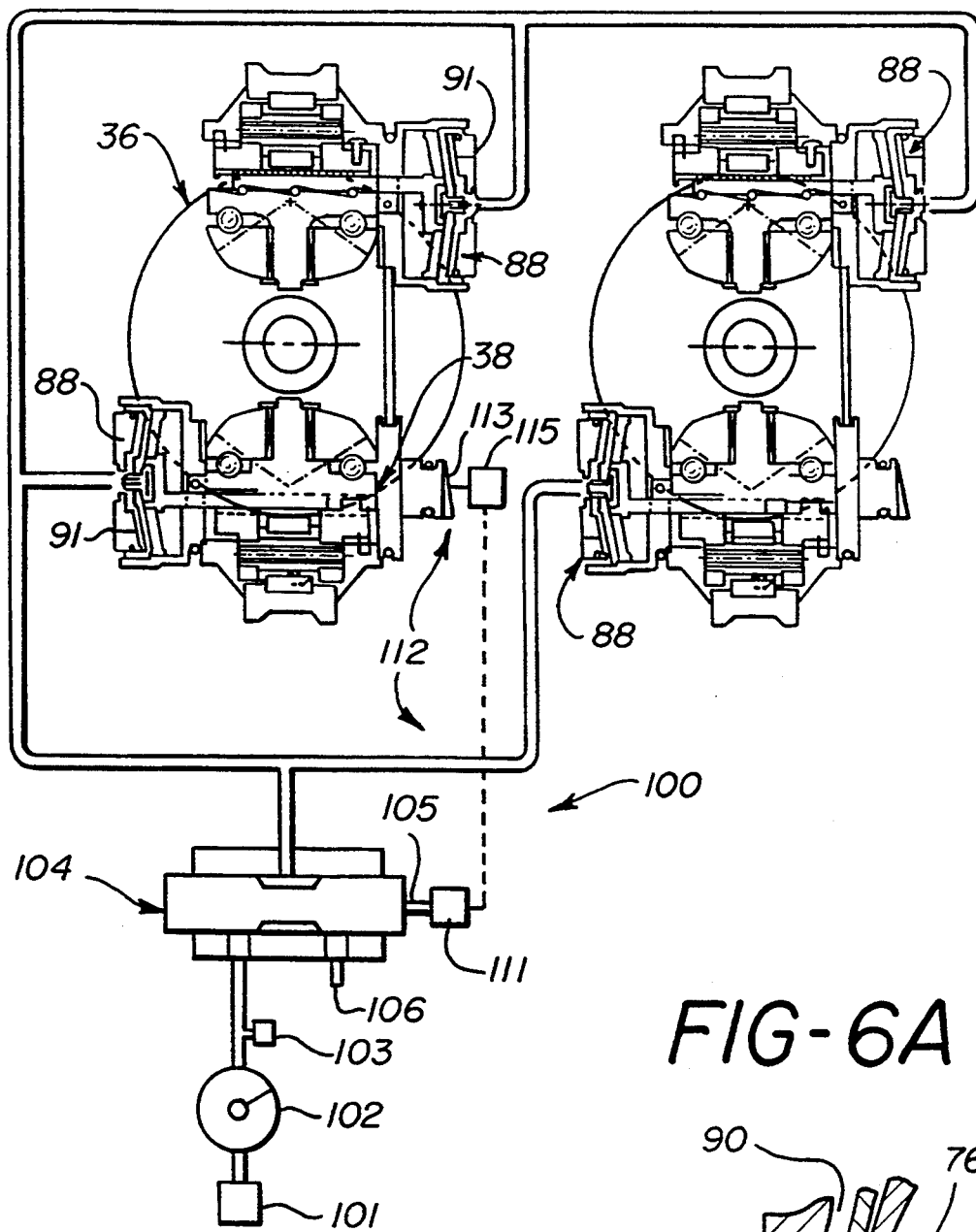
FIG. 6 is a schematic diagram of the preferred hydraulic systems for the means for forcing the pivot trunnions into engagement and the means for controllably pivoting the pivot trunnions to produce a transmission ratio change.

Referring now to FIG. 6, the continuously variable transmission of the present invention further includes a feedback structure 100 for terminating transmission ratio changing tilting of the pivot trunnions 36, 38 when a desired transmission ratio has been obtained. The feedback structure 100 preferably includes a source 102 of hydraulic pressure, such as a fixed displacement hydraulic pump, a tank 101, a pressure relief valve 103, and a hydraulic control valve 104 for controlling the flow of hydraulic fluid for initiating a transmission ratio change. The hydraulic control valve 104 is a two-way valve connected at one inlet port to the source 102 of hydraulic pressure, at another inlet port to a vent 106, and at an outlet port to the second hydraulic control means 88. The hydraulic control valve 104 is operable between at least two positions to supply hydraulic fluid and/or hydraulic pressure to or vent fluid or pressure from the second hydraulic control means 88.

Figure 6A:
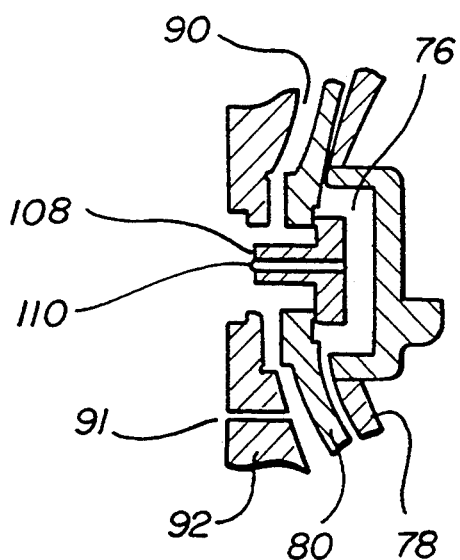
FIG. 6A is a detailed cross-sectional view of a preferred check valve and orifice in the hydraulic system of FIG. 6.

The feedback structure 100 further includes a check valve 108 and orifice 110 interconnecting the first and second hydraulic control means 72 and 88. As in the preferred embodiment of FIG. 6A, the check valve 108 and orifice 110 may be incorporated into second plate 80 or, alternatively, may be positioned outside hydraulic cylinder 74 and connected to the load volume 76 and first control volume 90 by lines. The check valve 108 allows one way flow from the first control volume 90 of the second hydraulic control means 88 to the load volume 76 of the first hydraulic control means 72, while the orifice 110 allows restricted flow in either direction therebetween. Orifice 110 may, thus, provide bleed fluid through the check valve 108 as shown, or may also be a hole in second plate 80, or comprise intended leakage around the second plate 80 and the wall of the hydraulic cylinder 74. In addition, to avoid trapping air in the control volume 90, an additional orifice 91 is preferably provided to slowly bleed fluid therefrom so that a constant, low flow of hydraulic fluid passes through the control volume 90. The orifice 110 serves to dampen rapid pressure changes and pressure spikes experienced in the control volume 90 by bleeding pressure down slowly from the load volume 76.

The feedback structure 100 further includes a mechanism 112 associated with at least one pivot trunnion 36, 38 to adjust the hydraulic control valve 104 upon pivotal movement of the pivot trunnion 36, 38 to a desired transmission ratio. The mechanism is preferably a cam 113 connected to a pivot trunnion 36, 38 which may be linked mechanically and/or electronically to operate the hydraulic control valve 104 upon reaching a desired rotation. As representatively shown, mechanism 112 includes cam 113, a sensor 115 to detect the position of the trunnion via cam 113 and send a signal to processor means 111, which in turn operates control valve operator 105 as desired.

Figure 8:
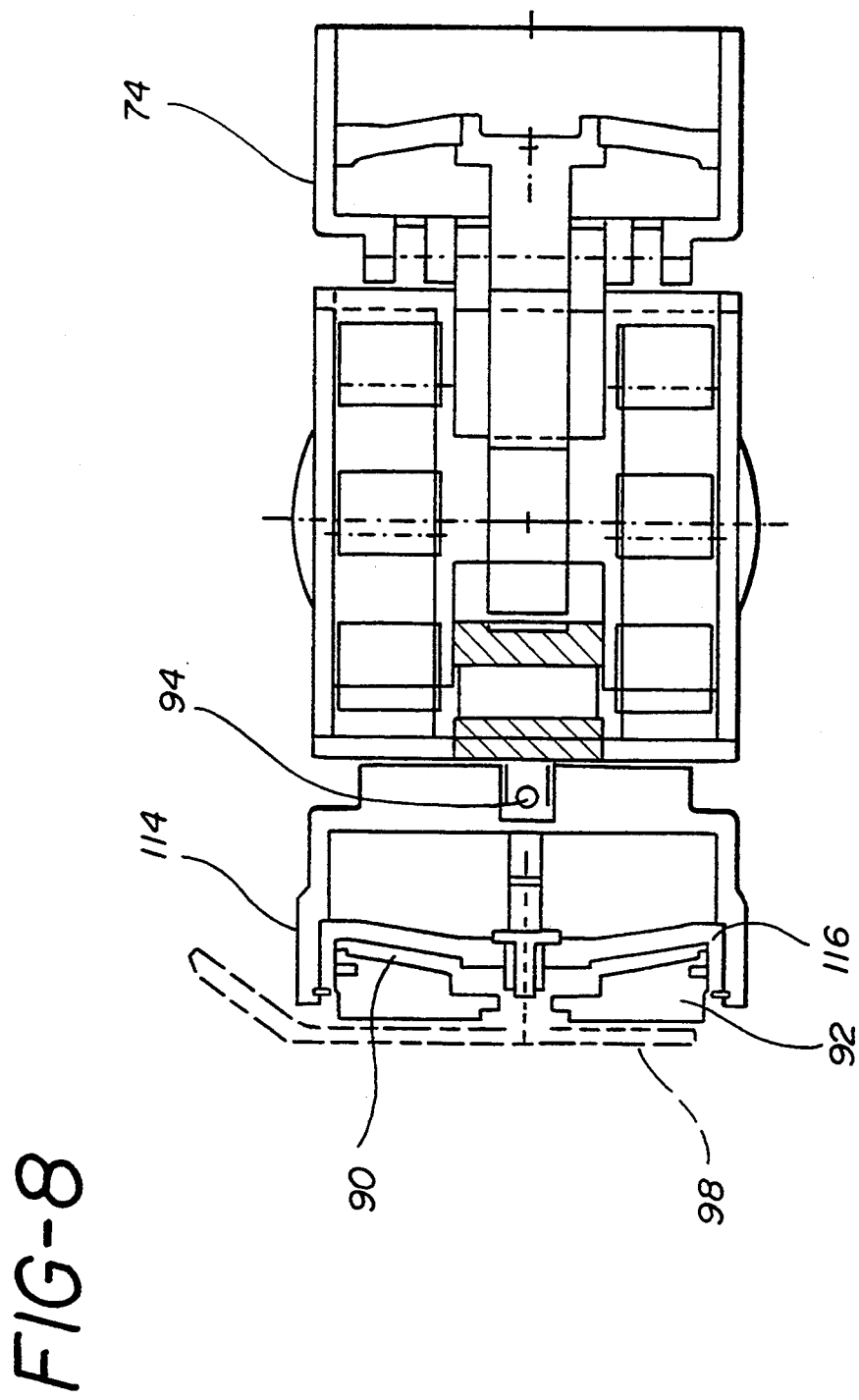
FIG. 8 is a cross-sectional view of an alternative embodiment of FIG. 2 taken along line 8—8 of FIG. 2.

Alternatively, as shown in the alternative embodiment of FIG. 8, in accordance with the present invention, the second hydraulic means 88 may be separate from the first hydraulic means 72. The second hydraulic means 88 includes, at each pivot trunnion 36, 38, a second hydraulic cylinder 114 having a control volume 90 defined therein between a third plate 92 and a fourth plate 116. The second hydraulic cylinder 114 is disposed opposite from the hydraulic cylinder 74, which has been moved to the other side of the pivot trunnion 38. Second hydraulic cylinder 114 also has its centerline along the pivot axis 40, 42. The second hydraulic cylinder 114 thereby provides, as described above for the preferred embodiment, controllable tilting of the pivot trunnions 36, 38 in unison in the same angular sense with respect to the central axis 14 to induce a transmission ratio change. The third plate 92 is, again, supported by a stress plate 98 (shown in phantom). The fourth plate 116 is movable to provide the desired control force. The second hydraulic cylinder 114 is connected to the pivot trunnion 36, 38 along the respective pivot axis 40, 42, such that the hydraulic cylinder 114 applies a control force at bolt 94 to tilt the pivot trunnion 36, 38. The control force causes pivoting thereof along the pivot axis 40, 42, while pivoting therewith. The feedback structure 100 will operate in the same manner as aforesaid, except that the check valve 108 and orifice 110 are interconnected between the load volume 76 and control volume 90 by hydraulic lines. The hydraulic cylinder 74 will operate as before for loading, except in an opposite sense. That is, load volume 90 will be defined between the cylinder and the first plate. This alternative is not preferred due to its additional size, and added complexity in operation. Alternatively, the cylinder 74 and second hydraulic cylinder 114 may be reversed in position, with corresponding changes in load volume and control volume defined therein to provide the desired forces and movements in the pivot trunnions. As well, care must be taken to avoid hydraulic lag in the hydraulic lines, where such is entirely avoidable with the preferred embodiment.

Figure 9:
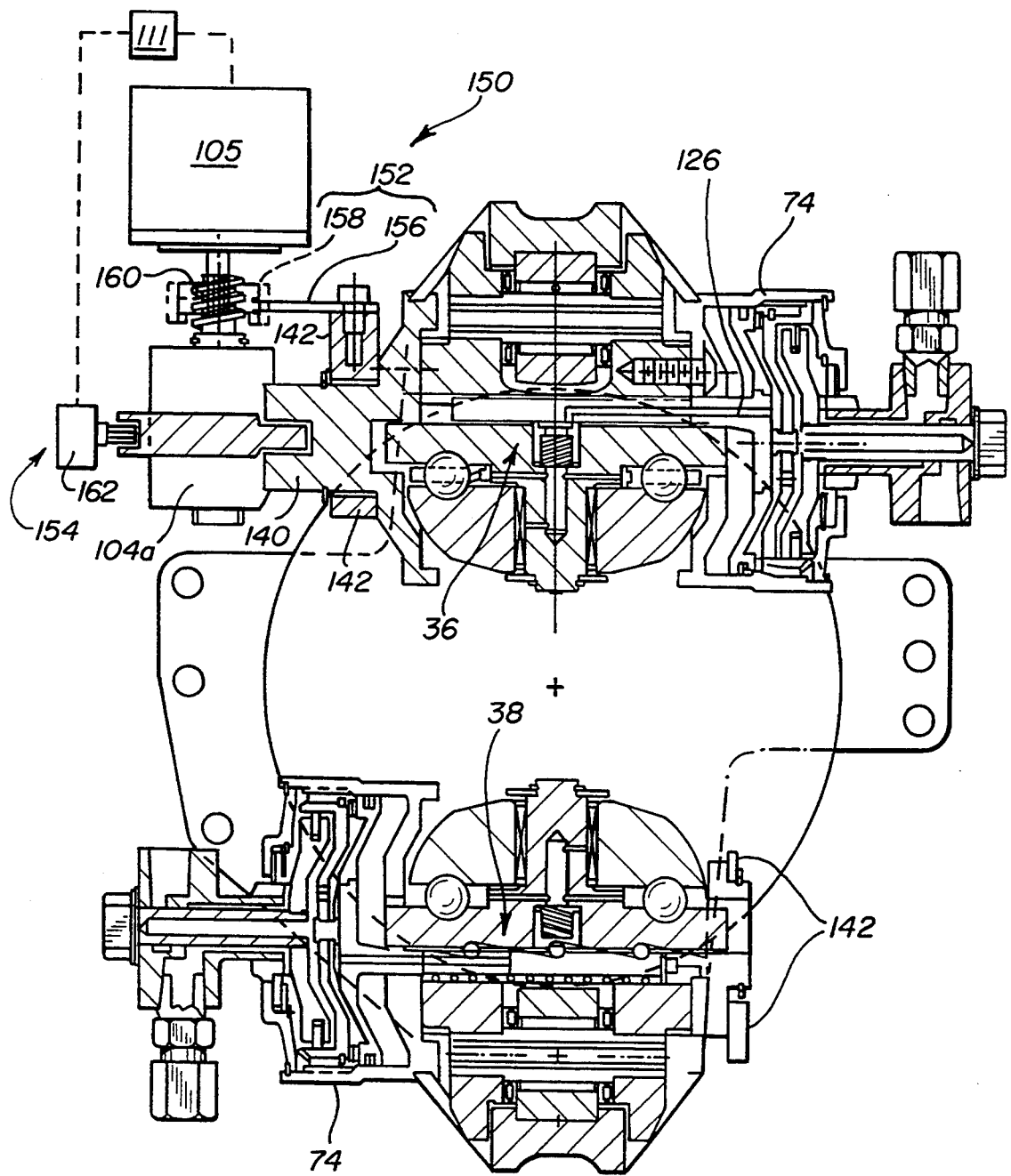
FIG. 9 is a cross-sectional view of FIG. 1 taken along line 9—9 showing the preferred embodiment of a double-acting hydraulic cylinder, pivot trunnions and related structure with the housing removed for clarity.
Figure 9A:
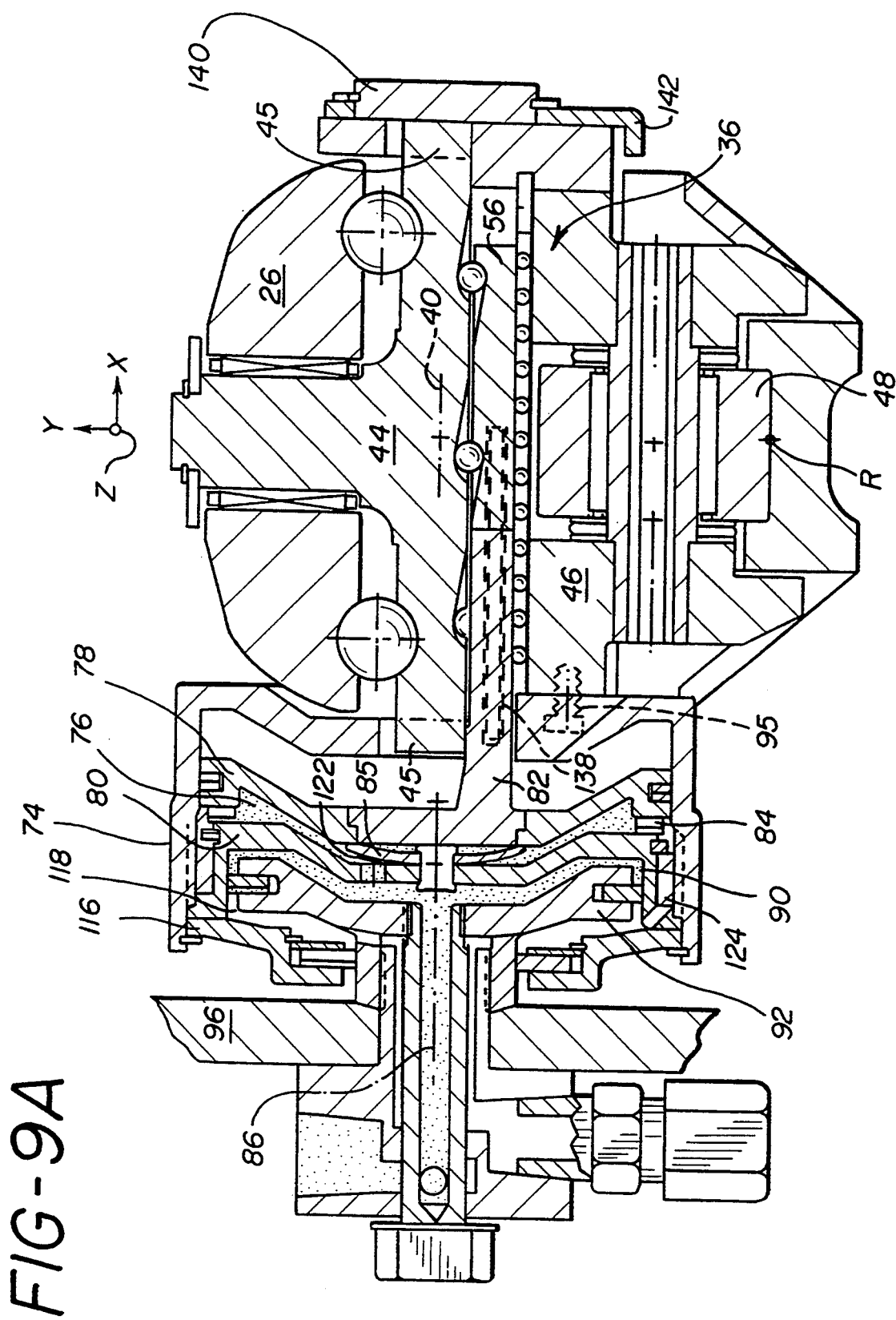
FIG. 9A is an expanded detail cross-sectional view of FIG. 9, further showing the oil path through the hydraulic cylinder for the transmission in the forward torque mode.
Figure 9B:
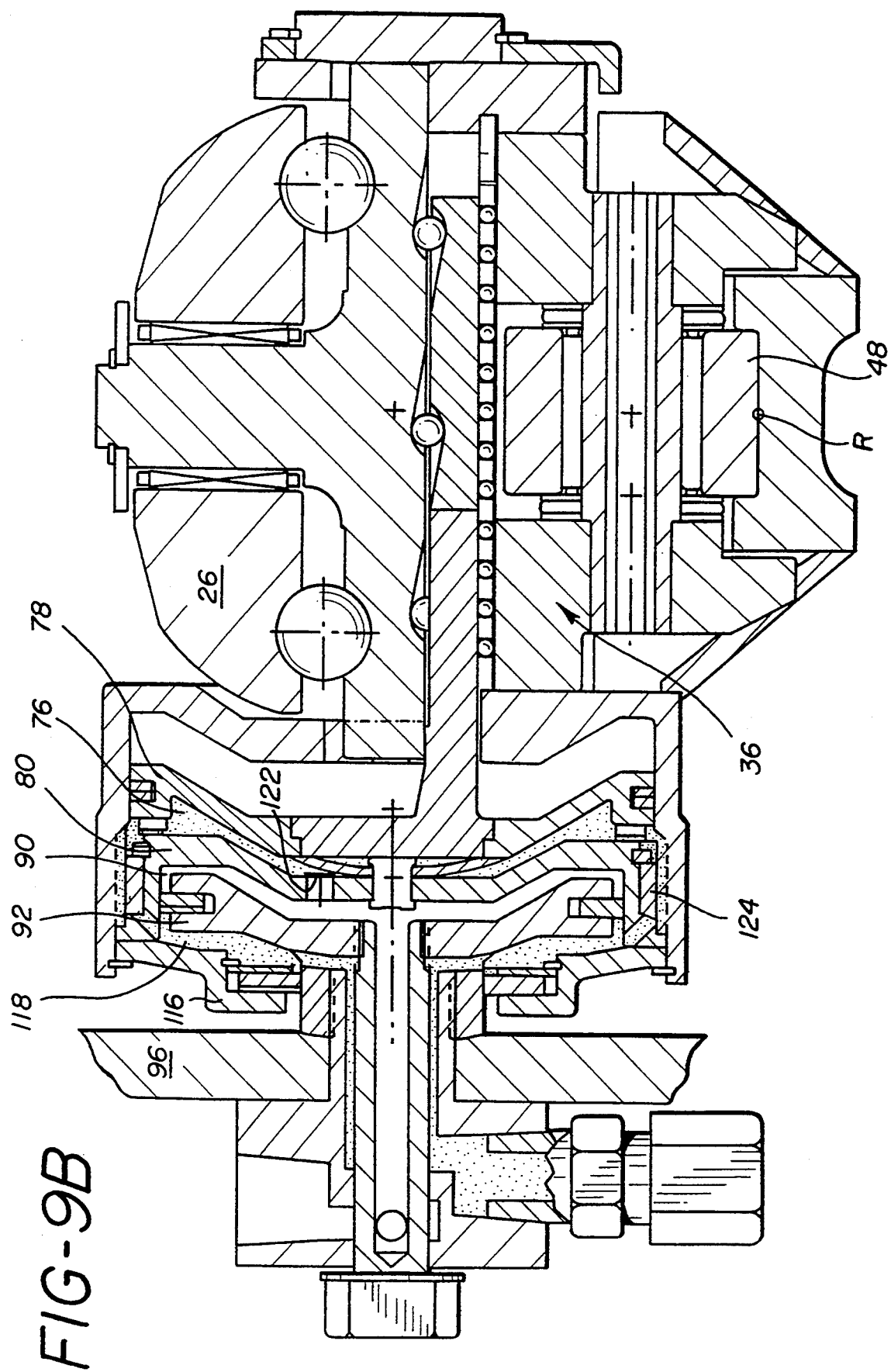
FIG. 9B is an expanded detail cross-sectional view of FIG. 9, shows the oil path through the hydraulic cylinder for the transmission in reverse torque mode.

Referring now to FIGS. 5 and 9, a further alternative embodiment is shown wherein the first and second hydraulic control means 72, 88 are in a single cylinder 74 which is a double-acting cylinder. In this alternative embodiment, in FIG. 5, the cylinder 74 has a fourth plate 116 which defines with the cylinder 74 a second control volume 118. Cylinder 74 thereby becomes a double-acting cylinder. Control rod 120 extends between the pivot trunnion 36, 38 and the fourth plate 116. FIGS. 9-9B illustrate another, preferred arrangement where the fourth plate 116 and third plate 92 define the second control volume 118. Third plate 92 is held stationary by connection to stress plate 96 (or alternately, housing 128). In FIG. 9, control rod 120 (shown in FIG. 5) is not required as the hydraulic cylinder 74 is attached to the pivot trunnion 36 by bolt 95. Despite these differences, the double-acting cylinders of FIGS. 5 and 9 function in a similar manner. A double-acting cylinder is desired where the toric discs 20, 22 and 30, 32 are rotated alternately in either direction around central axis 14. By way of illustration, such alternate rotation may be achieved with a multimode infinitely variable transmission arrangement as shown by U.S. Pat. No. 4,885,955, issued Dec. 12, 1989 to Kraus, the disclosure of which is incorporated by reference herein.

Figure 7:
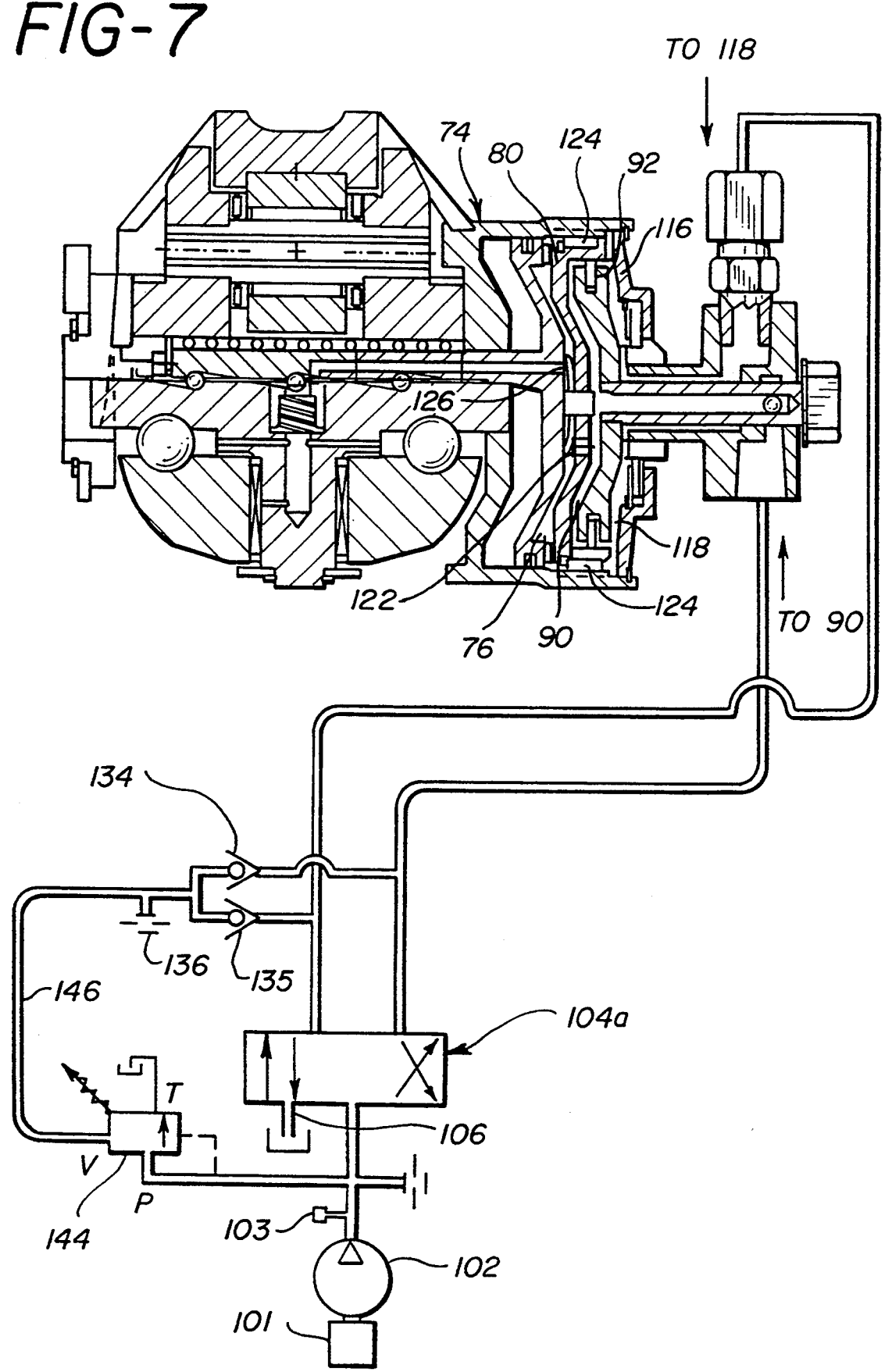
FIG. 7 is a partial schematic diagram of an alternative hydraulic system for the means for forcing the pivot trunnions into engagement and the means for controllably pivoting the pivot trunnions to produce a transmission ratio change.

A feedback structure which controls the cylinder 74 in the double-acting embodiments of FIGS. 5 and 9 is partially shown in FIG. 7. For simplicity, FIG. 7 only shows the hydraulic arrangement required for the double-acting cylinder 74, while omitting elements of the essentially mechanical feedback structure which appear in FIG. 6 and are understood to be part of the feedback structure. The omitted elements include a cam 113 (reversible as known in the art), a sensor 115 to detect the position of the pivot trunnion via cam 113, control valve operator 105, and a processor means 111, which operates control valve operator 105 as desired.

In accordance with FIGS. 7, 9A and 9B, it may be understood that where a double-acting cylinder is used, the load volume 76 receives the highest pressure from either first control volume 90 or second control volume 118, through either check valve 122 or 124, respectively. As shown, check valves 122 and 124 are preferably incorporated into the structure of the double-acting cylinder 74. Referring also to FIGS. 9A and 9B, check valve 122 may be a reed valve disposed beneath and backed by disc spring 85, shown open in FIG. 9A and closed in FIG. 9B. Check valve 124 is a check ring and which slides left and right inside the cylinder 74, shown left (closed) in FIG. 9A and right (open) in FIG. 9B, and preferably retained by a wave spring clip at its right end. When the check ring is shifted left, a sharp edge along the left edge of the check ring serves to seal bores which otherwise permit flow from second control volume 118 to load volume 76. Shown in FIGS. 7 and 9, an orifice 126 is also provided in the double-acting cylinder to allow pressure to slowly bleed down from the load volume 76. Pressure bleed down through orifice 126 dampens the effect on the contact surfaces of rapid pressure changes and pressure spikes experienced in the control volumes 90 and 118. Orifice 126 is preferably an orifice plate connected at the load volume end of a bore drilled through load rod 82, as shown in FIG. 7. The fluid bled through orifice 126 passes through the bore and serves to lubricate the trunnion bearings through a series of channels and bores shown. The preferred arrangement for the check valves and orifices is shown in FIG. 7, and it is understood that other double-acting hydraulic cylinder configurations and hydraulic circuits are possible which incorporate or include check valve structures and orifices to achieve the desired pressure relationships between the load volume 76 and first and second control volumes 90, 118 during operation. Where the continuously variable transmission includes a plurality of double-acting cylinders, it is further understood that each double-acting cylinder is connected or configured in like fashion.

Although it is not necessary for basic operation of the double-acting cylinder, the alternative feedback structure of FIG. 7 preferably includes a vented pressure regulating valve 144 which is connected to, but not in-line with, the outlet of the source 102 of hydraulic pressure at port P. A connection to tank is shown at T. The highest control pressure from either first control volume 90 or second control volume 118 is fed back to the vent port V of the pressure regulating valve 144 by vent line 146 through check valves 134 and 135 which transmit pressure from first and second control volumes 90 and 118, respectively. An orifice 136 is provided to prevent pressure build up in the vent line 146. As a result, the pressure at port P is the pressure at port V plus a set differential established by the spring of the vented pressure regulating valve 144. Since the pressure at V is the highest of the two control volume pressures, and the control volume pressures are a functions of transmission torque and ratio, the supply pressure is always controlled at a level slightly above that required, and never becomes excessive.

Operation of the vented pressure regulating valve 144 serves to both regulate the pressure supplied by the source 102 of hydraulic pressure, and reduce horsepower required to operate the source 102. Source 102 is preferably a fixed displacement pump, connected to the engine, and sized to satisfy minimum hydraulic fluid flow requirements at minimum engine revolutions per minute (rpm). At high rpm, maximum volume is provided. Pressure in the feedback structure depends on how much of this flow is choked off. If the four-way three position hydraulic control valve 104a and/or the vented pressure regulating valve 144 opens, pressure drops; and if either or both closes, pressure rises. Because flow through the four-way three position hydraulic control valve 104a is very low compared to the pump output, pump pressure cannot be controlled significantly by valve 104a alone. Absent the vented pressure regulating valve 144, which can open to shunt excess flow to tank, and thus reduce pressure, the resulting excess pressure increases horsepower demands on the engine. Thus, the preferred feedback structure, including vented pressure regulating valve 144, improves overall operating efficiency.

The preferred embodiment of the double-acting cylinder is shown in FIGS. 9—9B. In FIG. 9A the oil path through first control volume 90 and load volume 76 for the forward torque mode is illustrated. The oil path through the second control volume 118 and load volume 76 for the reverse torque mode is illustrated in FIG. 9B. It is noted that the traction coefficient in the reverse torque mode is reduced due to a smaller control surface area inside second control volume 118, compared to the surface area inside control volume 90. However, reverse torques are normally less than forward torques, and shorter in duration. Thus, although the contact surfaces are more heavily loaded during the reverse torque mode, there is insignificant impact on the life of the contact surfaces.

Other details shown in FIGS. 9-9B are preferred in the double-acting embodiment of the present invention, and may be used in the other embodiments hereof. While FIG. 9 refers illustratively only to pivot trunnion 36 and related components, it is understood that such details may equally be applied to pivot trunnion 38 and related components. In particular, in FIGS. 9-9B the hydraulic cylinder 74 is rigidly connected, rather than hinged, to the pivot trunnion 36 by known means, such as a bolt 95. Correspondingly, the connection of the load rod 82 to the H-shaped rod 56 is different. The load rod 82 and H-shaped rod 56 are both slotted and share a rectangular key 138 to prevent tilting with respect to each other. This simplifies and strengthens the overall structure. However, as a result, tilting of the pivot trunnion 36 about point P for transmission ratio change causes small transverse motion of the plates 78, 80 and 92 relative to their respective seal rings in the hydraulic cylinder 74. Additional groove depth is provided in the plates 78, 80 and 92 to permit such transverse motion. With proper choice of material for the seal rings, wear at the rings due to transverse motion of the plates should not be significant, as the total tilt of the pivot trunnion is very small. A low friction, rigid plastic or composite material is preferred, which material can withstand the high stresses, operating temperatures and fluids without significant creep, for example, teflon-coated aluminum.

Further preferred details shown in FIGS. 9-9B include the addition of a tab 45 at each end of the first portion 44 of the pivot trunnion 36 to locate the first portion 44 in the "z" direction above the second portion 46 of the pivot trunnion 36. Within the assembly shown, the first portion 44 is further restrained in the "x" direction by the hydraulic cylinder 74 and the opposing trunnion end 140. Finally, rotation of the entire trunnion assembly about the "y" axis is constrained by a connecting rod 142 or plate which extends to the housing 128 or to a pivot trunnion in a neighboring toric cavity 24.

In a further aspect of the present invention shown in FIG. 9, improved alternate rotation of a multimode transmission arrangement may be achieved with a double acting cylinder 74 and the electro-mechanical feedback system 150 shown. Preferred in practicing the preferred embodiment of FIG. 9, the feedback system 150 incorporates the hydraulic improvements of FIG. 7, without the cam 113 arrangement of FIG. 6. A drawback of the cam 113 is that it is used to sense both pivot and rotation of the pivot trunnion. It is desirable to uncouple the sensing of these two motions so that the amplitude of each can be measured and varied independent of the other. Mechanical systems which have been provided to this end in the prior art have suffered from complexity. Entirely electronic feedback systems have been developed, but control therewith has been too unstable, and their use has been avoided.

In accordance with the present invention, the feedback system 150 includes a mechanical means 152 for sensing tilt of the pivot trunnion 36, and electronic means 154 for sensing rotation of the pivot trunnion. The mechanical means 152 for sensing tilting includes a feedback link 156 and a control nut 158 connected at one end of feedback link 156. Feedback link 156 is connected at its other end to connecting rod 142. Connecting rod 142 extends between pivot trunnions in adjacent toric cavities (as representatively shown in FIG. 1), and thus extends into or out of the page in FIG. 9. Preferably, the feedback link 156 connects to the center of the connecting rod 142, rather than to a specific trunnion end, so that the tilt signal is an average of the tilt of at least two pivot trunnions in separate cavities (not shown). As well, such averaging prevents temporary, transient or unstable tilt conditions of a single trunnion from effecting the entire transmission operation. Where a single toric cavity is provided in a transmission, the connecting rod 142 is connected to the housing or frame. In any case, the feedback link 156 does not rotate, but simply tilts with the connecting rod 142. Preferably, the feedback link 156 is forked, and receives a rectangular control nut 158 between the forks to prevent rotation of the control nut 158. The nut includes slots on either side to receive the forks of the feedback link 156, and allow tilting thereof. The control nut 158 is further engaged in the threaded end portion 160 of the spool of four-way three position hydraulic control valve 104a. Thus, as the pivot trunnion 36 tilts, the spool slides up or down in four-way, three position hydraulic control valve 104a.

The electronic means 154 for sensing rotation of the pivot trunnion 36 includes an electronic angle transducer, such as a digital encoder, a variable capacitor, or a potentiometer 162 as illustratively shown in FIG. 9, operably connected to the trunnion end 140 by a connecting arm 164 to measure the rotation of pivot trunnion 36. The trunnion end 140 preferably includes a hex socket located along pivot axis 40, and receives an external ball hex at one end of connecting arm 164 which allows for tilting of the pivot trunnion. Rotation of the pivot trunnion about pivot axis 40 is thereby sensed by the electronic angle transducer (potentiometer 162), which generates a signal conditioned by a processor 111 to operate a servo control. The servo control, by way of example, may be a linear servo motor or other servo motor, such as stepper motor operator 105 shown in FIG. 9. The stepper motor operator 105 has a hex or keyed stem which is received in an axial extending socket at the center of threaded end portion 160 of the spool. Rotation of the stem rotates the threaded end portion 160 to displace the spool, and operate the hydraulic system shown in FIG. 7. In this manner, a single stepper motor operator 105 and processor 111 is required to sense and control the transmission operation through the hydraulic system. This eliminates mechanical feedback mechanisms, and simplifies operation. In addition, this arrangement further simplifies reversing rotation of the toric discs 20, 22 and 30, 32, for example, when the continuously variable transmission of the present invention is used in a multimode transmission arrangement. Reversing rotation of the toric discs requires reversing the relationship between trunnion rotation and spool translation of hydraulic control valve 104a. With the electronic interface between the electronic angle transducer (e.g. potentiometer 162) and the servo control (e.g. stepper motor operator 105), in is simple to reverse the sign of the signal in the processor 111. This allows elimination of a complicated mechanical feedback reversing mechanism.

A further feature of the present invention is that the continuously variable transmission is both compact and easy to assemble. Several subassemblies are possible, which facilitate handling for assembly, inspection and repair. The support structure 10 comprises a housing 128, shown in FIGS. 1 and 5, which supports the input shaft 16, output shaft 18, and toric discs 20, 22. As further shown in FIGS. 1 and 5, stress rods 98 are provided which interconnect the tracks 50. The stress rods 98, tracks 50, and stress plates 96, which are shown in FIG. 2 connected to the tracks 50, form a track and stress rod subassembly 130 which may be preassembled and mounted in the housing 128. As described in greater detail above, the elements of this subassembly 130 support the traction rollers 26, 28 pivot trunnions 36, 38, and the first and second hydraulic means 72 and 88 of the means for controllably pivoting and means for forcing. Moreover, during operation, the stress rods 98 of the subassembly 130 take up opposing forces (e.g. load forces) imposed upon the tracks 50, and the stress plates 96 take up opposing control forces, so that the stresses produced thereby are substantially constrained within the subassembly 130. The stress on housing 128 is thereby reduced. Thus, the housing 128 can be made of lighter, thinner materials.

In addition, a further trunnion and traction roller subassembly 132 indicated in FIG. 4 may be pre-assembled and inserted into the track and stress rod subassembly 130 during final assembly. Each of these subassemblies 132 include a pivot trunnion, traction roller rotatably supported by the pivot trunnion, and that portion of the means for forcing which is disposed in the pivot trunnion.

The present invention may be constructed of materials known in the art. In use, the continuously variable transmission 10 may be used in combination with a clutch structure, as shown in the '030 patent or other such structures, for example the multimode, reversible clutch structure shown in U.S. Pat. No. 4,885,955 to Kraus, previously referenced.

While certain representative embodiments and details have been shown for purposes of illustrating the present invention, it will be apparent to those skilled in the art that various changes in the apparatus disclosed herein may be made without departing from the scope of the invention, which is defined in the appended claims.

What is claimed is:

1. A continuously variable transmission comprising:
   a support structure;
   two toric traction discs rotatably supported by said support structure for rotation about a central axis, one for rotation with an input shaft and the other for rotation with an output shaft, said toric discs having opposing traction surfaces defining therebetween a toric cavity;
   at least two motion transmitting traction rollers disposed in said toric cavity in spaced relationship and in engagement with said toric discs for transmission of motion therebetween, each of said traction rollers being rotatably supported by a pivot trunnion supported to pivot about a pivot axis;
   means for controllably pivoting said pivot trunnions for a transmission ratio change; and
   means for forcing said traction rollers into force transmitting engagement with said toric discs, at least a portion of said means for forcing disposed in each of said pivot trunnions to produce an outward load force from within each said pivot trunnion and vary the load force as needed to maintain said force transmitting engagement, each of said pivot trunnions including
   a first portion supporting said traction roller and a second portion including a pivot structure, and
   said portion of said means for forcing disposed in said pivot trunnion positioned between said first and second portions, said portion of said means for forcing disposed in each of said pivot trunnions comprising
   a wedging means, and
   means for sliding said wedging means in said pivot trunnion to produce an outward load force from within said pivot trunnion.

2. The continuously variable transmission of claim 1 wherein:
   said pivot structure includes a support roller mounted on said second portion; and
   said support structure includes a partial circular track structure receiving and supporting each support roller such that each pivot trunnion pivots about its pivot axis.

3. The continuously variable transmission of claim 1 wherein
   said wedging means comprises at least one wedge having at least one ramp.

4. The continuously variable transmission of claim 3 wherein said means for sliding includes a plurality of bearings disposed between the surfaces of said at least one wedge and the opposing surfaces of said first and second portions of said pivot trunnion.

5. The continuously variable transmission of claim 1 wherein said wedging means comprises:
   a surface in said first portion of said pivot trunnion having a plurality of first cam surfaces therein; and
   a rod slidably disposed between said first and second portions of said pivot trunnion, said rod having a plurality of second cam surfaces in opposing relationship to said first cam surfaces; and
   a plurality of roller bearings, ones of said roller bearings disposed between opposing ones of said first and second cam surfaces to force said first and second portions to vary in separation when said rod is slidably positioned therebetween.

6. The continuously variable transmission of claim 5 further comprising a plurality of bearings disposed between said rod and said second portion of said pivot trunnion for slidably positioning said rod.

7. The continuously variable transmission of claim 5 wherein said rod comprises two parallel posts and a cross member interconnecting said posts to form a H-shape and said second cam surfaces are formed in said posts of said rod.

8. The continuously variable transmission of claim 7 further comprising:
   a first interlocking element connected to said first portion of said pivot trunnion and positioned between said posts of said rod, and a second interlocking element connected to said second portion of said pivot trunnion and engaging said first interlocking element to maintain the relationship between said first and second portions of said pivot trunnion when force is applied to said rod.

9. The continuously variable transmission of claim 8 wherein said first interlocking element is a tongue and said second interlocking element is a matching groove such that said tongue fits into said groove.

10. An continuously variable transmission comprising:

a support structure including a partial circular track structure;

two toric traction discs rotatably supported by said support structure for rotation about a central axis, one for rotation with an input shaft and the other for rotation with an output shaft, said toric discs having opposing traction surfaces defining therebetween a toric cavity;

at least two motion transmitting traction rollers disposed in said toric cavity in spaced relationship and in engagement with said toric discs for transmission of motion therebetween, each of said traction rollers being rotatably supported by a pivot trunnion supported to pivot about a pivot axis, each of said pivot trunnions comprising a first portion supporting said traction roller and a second portion including a pivot structure having a support roller mounted on said second portion and received and supported by said partial circular track structure such that each pivot trunnion pivots about its pivot axis;

means for controllably pivoting said pivot trunnions for a transmission ratio change; and means for forcing said traction rollers into force transmitting engagement with said toric discs, at least a portion of said means for forcing disposed between said first and second portions of each of said pivot trunnions, said portion of said means for forcing disposed in each of said pivot trunnions comprising, a first wedge having a first ramp, a second wedge having a second ramp, said second wedge being connected to and parallel with said first wedge, and means for sliding said first and second wedges in said pivot trunnion to produce an outward load force from within each said pivot trunnion and vary the load force as needed to maintain said force transmitting engagement.

11. The continuously variable transmission of claim 10 wherein said means for sliding includes a plurality of bearings disposed between the surfaces of said first and second wedges and the opposing surfaces of said first and second portions of said pivot trunnion.

* * * * *